United States Patent
Truesdale

(10) Patent No.: US 9,696,610 B2
(45) Date of Patent: Jul. 4, 2017

(54) CHAIN LINK FENCE ATTACHMENT CLIP

(71) Applicant: Gary Truesdale, El Segundo, CA (US)

(72) Inventor: Gary Truesdale, El Segundo, CA (US)

(73) Assignee: Gary Truesdale

( * ) Notice: Subject to any disclaimer, the term of this patent is extended or adjusted under 35 U.S.C. 154(b) by 0 days.

(21) Appl. No.: 14/846,546

(22) Filed: Sep. 4, 2015

(65) Prior Publication Data

US 2017/0068147 A1    Mar. 9, 2017

(51) Int. Cl.
*G03B 17/56* (2006.01)
*F16M 13/02* (2006.01)
*E04H 17/02* (2006.01)

(52) U.S. Cl.
CPC .......... *G03B 17/561* (2013.01); *F16M 13/02* (2013.01); *E04H 17/02* (2013.01)

(58) Field of Classification Search
USPC .............................. 396/419; 248/309.1, 316.6
See application file for complete search history.

(56) References Cited

U.S. PATENT DOCUMENTS

| | | | | |
|---|---|---|---|---|
| 5,582,377 A * | 12/1996 | Quesada | ................. | A47F 5/083 24/343 |
| 5,769,292 A * | 6/1998 | Cucheran | ................ | B60R 9/045 224/319 |
| 5,959,255 A * | 9/1999 | Langlie | ................ | H01B 17/145 174/161 F |
| 6,322,460 B1 * | 11/2001 | Asci | ................... | A63B 69/0002 24/114.5 |
| 7,484,701 B2 * | 2/2009 | Hsieh | ..................... | A47F 5/0853 211/106.01 |
| 8,028,966 B2 * | 10/2011 | Chen | ..................... | A47F 5/0006 211/59.1 |
| 8,398,316 B2 * | 3/2013 | Mota | ..................... | G03B 17/00 248/215 |
| 8,424,817 B1 * | 4/2013 | Chen | ........................ | B25H 3/00 211/70.6 |
| 9,108,096 B2 * | 8/2015 | Solheim | ............ | A63B 69/3632 |
| 9,206,941 B2 * | 12/2015 | Smith | .................... | F16M 11/04 |
| 2003/0156836 A1 * | 8/2003 | Ward | ..................... | F16M 11/08 396/419 |
| 2008/0296449 A1 * | 12/2008 | Carnevali | ............... | B60R 11/02 248/205.1 |
| 2009/0134376 A1 * | 5/2009 | Garceau | ................ | E04H 17/066 256/47 |

(Continued)

*Primary Examiner* — Clayton E Laballe
*Assistant Examiner* — Linda B Smith

(57) ABSTRACT

The purpose of this clip is to attach to a chain link fence and provide a connection point for a device or structure. The method of attachment is provided by two mechanically combined structural members with peripheral retaining grooves that fit the fence wire. The clip is compressed or expanded to grip two parallel wires of a chain link fence. The structural members of the clip move the retaining grooves in parallel for a precise fit with the fence. The clip can be engaged with the fence in an internal or external manner. In the preferred embodiment of this invention, the chain link fence clip utilizes a spring to force the two retaining grooves into engagement with the fence. The clip can be locked in place for a strong semi-permanent connection. Springs, cams, linkages, and screws can be used to automate engagement for quick tool-less attachment and removal.

5 Claims, 13 Drawing Sheets

(56) References Cited

U.S. PATENT DOCUMENTS

2012/0305290 A1\* 12/2012 De France ............... H02G 7/12
                                                                                                                   174/146
2014/0001325 A1\* 1/2014 Friesch ............. A63B 71/0045
                                                                                                                   248/231.9

\* cited by examiner

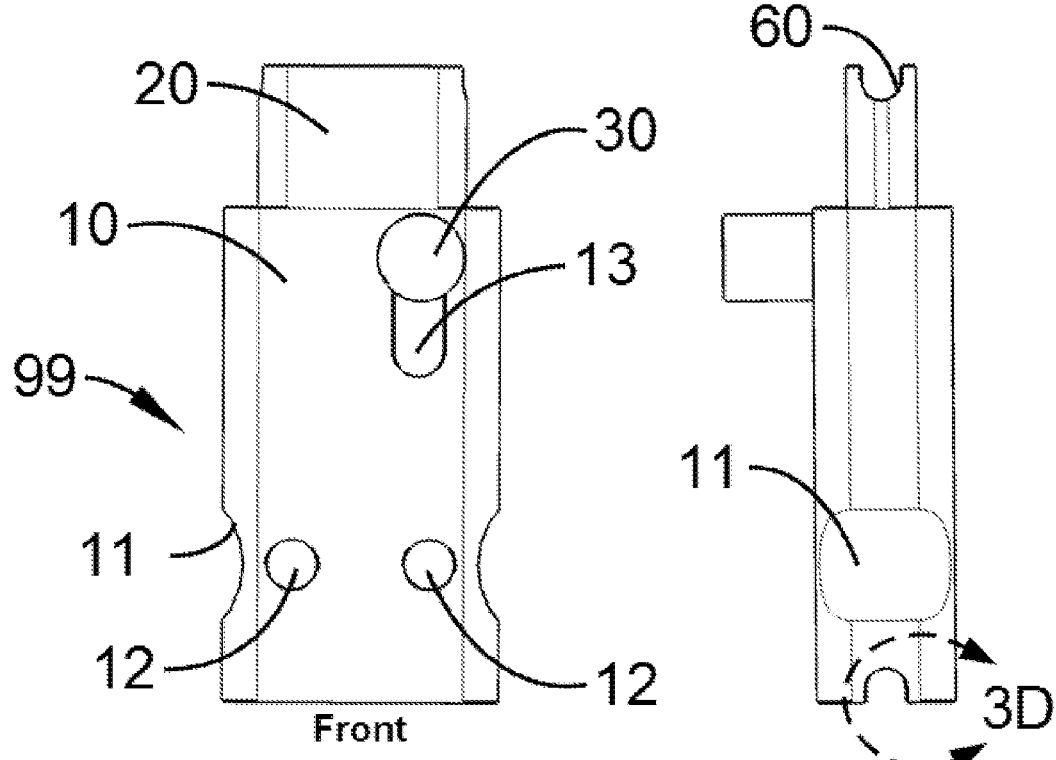
FIG. 3A
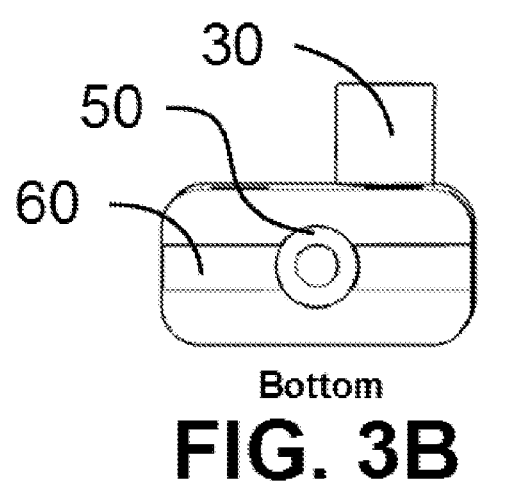
FIG. 3B
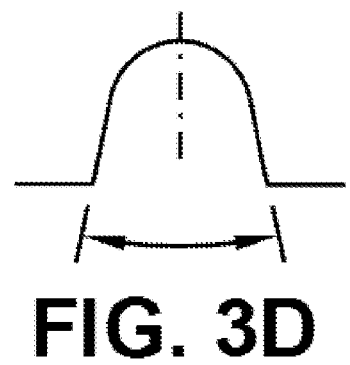
FIG. 3C
FIG. 3D

CHAIN LINK FENCE ATTACHMENT CLIP

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

Field

The present invention is generally related to devices used for attachment of an object to a chain link fence. More particularly this invention is related to clips and hangers designed for rapid attachment of an object to a chain link fence and also to clips, brackets, and clamps designed for reliable semi-permanent structural attachment to a chain link fence.

Prior Art

There are a number of devices developed that attach equipment to a chain link fence. These devices are most commonly referred to as hangers and clips. There are many methods of attachment defined for these devices. There are also devices known as brackets and clamps that permanently and structurally attach chain link fencing components.

Chain link fences are used extensively in society to define boundaries. Countries, businesses, schools, parks, and pools utilize chain link fence to control access. The sport of racing utilizes chain link fence to protect spectators. Chain link fences are broadly utilized to contain the ball within the game space and protect spectators in sports like Baseball, Softball, and Tennis.

Chain link fence also referred to as cyclone fence or diamond-mesh fence is a type of woven fence made from steel wire. The wires run vertically and are bent into a 45 degree diamond pattern. Each wire hooks with the wires adjacent and is stretched into position to form a uniform diamond pattern as illustrated in FIG. 7. Chain link fence is installed setting vertical posts in concrete and attaching the fence to them. The whole chain link fence installation provides a robust structural barrier with only a minor reduction in visibility through the barrier.

For the purposes of this disclosure the plane of the fence is defined as the plane established between the two closest adjacent vertical fence posts supporting the considered section of chain link fence. The wires that form each diamond shaped opening in the fence generally form two pairs of parallel wires. The two pairs of wires that define each opening in a chain link fence are perpendicular to one another and in two parallel planes offset by the thickness of the wire and the distance required to bend the wire to weave the fence. All of the wires in one plane are parallel to one another. All of the wires in the second plane are parallel to one another and perpendicular to the wires of the first plane. It is with this dual parallel plane understanding of the chain link fence that we define both planes of perpendicular wires more generally as a single plane established between the two closest adjacent vertical fence posts. By design the installed fence clip is attached to two parallel fence wires. The parallel wires are coplanar so the clip is either installed on one plane or the other so the general definition of a single plane of fence between two adjacent fence posts best describes the intended use of this device. FIG. 8 illustrates the dual plane woven nature of chain link fence and the manner in which the fence clip attaches to two co-planar wires. Direction 250 and Direction 251 in FIG. 7 represent vectors in the plane of the fence. Looking through a chain link fence at an object directly on the opposite side of the fence would be along a vector perpendicular to the plane of the fence.

For the purposes of this disclosure semi-permanent attachment of this invention to a chain link fence means permanently attached until intentionally removed. Intentional removal is accomplished by removal of a screw, pin, lock or other re-attachable mechanical element.

There are many examples of clips, hangers, and brackets used to attach an item to a chain link fence. Some devices attach to the fence with bolts through the fence; some devices use hooks, and others are attached with friction fit into the fence openings. In the current field of inventions there are no devices that provide the capability to attach and remove easily while providing a secure semi-permanent attachment to the fence. In the current field of inventions there are no devices that mechanically engage with two parallel wires in a chain link fence and apply force in the direction of the plane of the fence for attachment. In the current field of inventions fence hangars, brackets, and clips exist on one side of the plane of the fence or the other. There are no devices that attach themselves precisely on the plane of a chain link fence and fit within a single cell of said fence.

Past proposals include specific methods of attachment for chain link fences. An example of one such device is shown with U.S. Pat. No. 8,523,127 B1 to Bennett. This design provides a monolithic hanger that can be inserted into a single opening in a chain link fence, then rotated 45 degrees to engage peripheral grooves with the wires of the chain link fence. The hanger can be removed by rotating it forty five degrees again and sliding it out of the opening in the fence. Various embodiments are proposed for holding a bat, or a jacket, or a drink. The monolithic block and the grooves are sized to provide the required fit with the fence so size of the device and distance between slots has to match the opening in the fence and the diameter of the wire. This invention does not provide flexibility to work with the different sized openings in chain link fence. This device cannot be locked in place. This device is dependent on its own elasticity and the elasticity of the fence to provide a suitable fit. The fit of this device is dependent on the size of the device and the size of the fence opening. This device is not a multiple component mechanism that engages precisely with two parallel wires in a chain link fence.

Another type of hanger is displayed in U.S. Pat. No. 4,953,317 to Mosteller. This hanger for a chain link fence has three arms with locking balls on the end of the arms. There is a spherically shaped central hub that serves as a hook to support various items. The hanger is attached to the fence by stretching the two parallel arms over the fence wires. The third arm attaches to a fence wire perpendicular to the other two wires and secures the hanger. The fence wire is locked between the arms and the balls at the end of the arms. The elasticity of the hanger and the elasticity of the fence lock the hanger in place. This device does not provide a semi-permanent connection to the fence. This device does not provide the ability to be locked in place. This invention lacks the ability to adjust the fit of the device. This device is not a multiple component mechanism that engages precisely with two parallel wires in a chain link fence.

Another method of attachment to a chain link fence is evidenced in U.S. Pat. No. 8,322,667 B2 to Zannoni. The hanger has an attachment side with integral short and long legs with grooves to attach to a chain link fence. The opposite side is the utility side and it can be a hook, bottle holder, a sign, and other items. This hanger uses its own elasticity to connect to the fence and hold it in place. This hanger secures itself with all four wires that define an opening in a chain link fence by providing long and short legs. This invention lacks the ability to adjust the fit of the device. This device cannot be locked in place. This device relies on the elasticity of the base thermoplastic resin to provide engagement with the fence and cannot provide a semi-permanent attachment. This device is not a multiple component mechanism that engages precisely with two parallel wires in a chain link fence.

In the current field of inventions utilized to attach objects to a chain link fence devices lack one or more of the following functional capabilities.
  small size
  light weight
  fast and easy attachment
  secure lockable attachment
  semi-permanent structural attachment
  ability to fit chain link fence of varying size openings In the current field of inventions utilized to attach objects to a chain link fence there are no multiple component mechanisms engineered to engage precisely with two parallel wires in said chain link fence.

In the current field of inventions utilized to attach objects to a chain link fence there are no multiple component mechanisms that secure themselves by applying force in the direction of the plane of the fence.

SUMMARY

This fence clip is a device capable of fast and strong mechanical engagement with a chain link fence. The purpose of this clip is to easily and quickly attach to a chain link fence and provide a secure connection point for a separate device or structure. This invention is designed, sized, and priced for commercial appeal in the cell phone market. The method of attachment is provided by at least two structural members mechanically coupled to engage peripheral retaining grooves with two parallel wires in a chain link fence. The clip can be engaged with the fence in an internal or external manner by compressing or expanding to grip the inside or outside of the fence wire as designed. The clip attaches to two parallel wires in the fence and applies force in the direction of the plane of the fence. The present invention can be locked in place to provide a semi-permanent attachment. The two parallel wires can be part of the same diamond shaped opening in the fence, or they can be separated by any number of openings to spread the connection points for added stability or to attach a larger object to the fence. Multiple fence clips can be used together to facilitate a stronger multiple point connection to the fence.

In the preferred embodiment the present invention utilizes a spring to force two linear guided structural members into engagement with the fence. One structural member precisely slip fits inside the other in a telescope arrangement providing smooth linear motion and alignment of the retaining grooves. Each structural member has a retaining groove at its far end. The opposing retaining grooves engage securely with two parallel wires of a chain link fence. This embodiment utilizes linear motion and springs to engage with the fence but the invention is not limited to this manner of automated engagement. Additional embodiments of this invention use mechanical elements of hinges, levers, and screws to facilitate mechanical engagement with the fence. The present invention is a multiple element mechanism that precisely engages with two parallel wires of a chain link fence and applies force in the direction of the plane of the fence.

It is an object of this invention to provide for quick attachment and removal of the clip to the fence. It is an object of this invention to provide a method to easily attach an object to a chain link fence with one hand. It is an object of this invention to provide a semi-permanent and secure structural attachment to a chain link fence. It is an object of this invention to attach to the fence without tools.

The present invention is particularly useful for attaching a small camera or cell phone to a fence for the purpose of making a video recording of a sporting event where a chain link fence separates the field of play from the spectators. Securing the chain link fence clip into a given diamond shaped opening in the fence provides a convenient and secure attachment point for a cell phone or camera to video record the sporting event. It is a desired function of the present invention to provide a secure cell phone or camera attachment point close enough to the chain link fence so any video is recorded through a single opening in the chain link fence and the fence is therefore not visible in the video recording.

A structural fence clip 199 provides an alternative embodiment of the chain link fence clip and can be engaged manually and locked into position with bolts or pins. Two opposing structural members with retaining grooves are engaged with the fence wire and bolted together in position. Serrated faces on opposing structural members lock together to provide a solid semi-permanent structural connection. This structural embodiment is illustrated in FIG. 9 and FIG. 10. This structural embodiment can be locked in place. Multiple structural fence clips can be used together to provide multiple attachment points.

The chain link fence clip is fundamentally different from other devices as it is designed to mechanically engage with two parallel wires in a chain link fence. The clip is also unique in securing to the fence by applying force in the direction of the plane of the chain link fence, not perpendicular to the fence or through the fence. The chain link fence clip includes a multitude of threaded holes to flexibly attach standard camera and phone equipment to the clip and secure said equipment to the fence. Tool-less installation and one-handed installation are advantages of the fence clip. The clip is strong enough to provide semi-permanent structural attachment to a chain link fence.

DRAWINGS—FIGURES

FIG. 3A to 3C are principle views of the preferred embodiment of the present invention.

FIG. 3D is a profile view of the retaining groove 60

Figure 1:
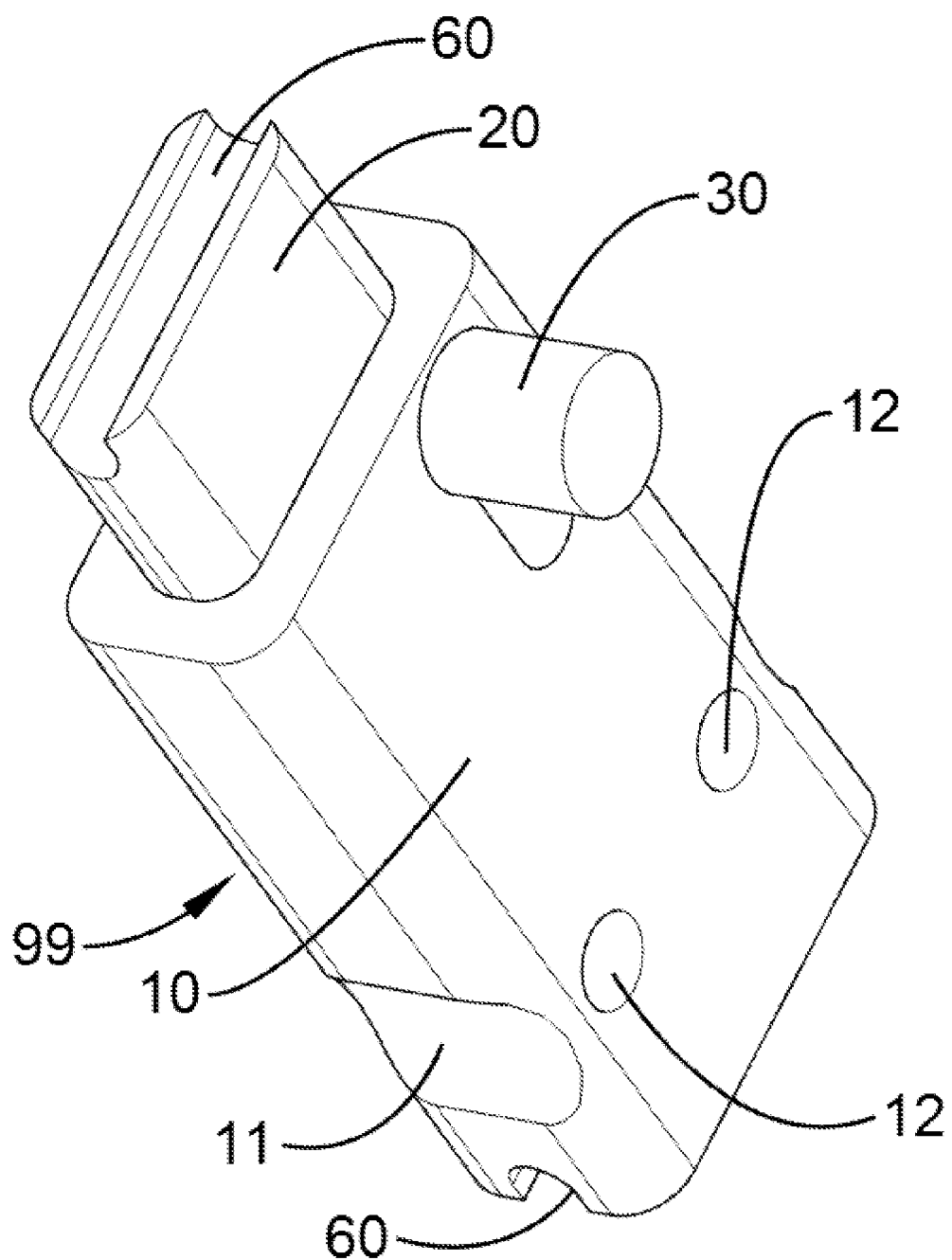
FIG. 1 is a perspective view of a preferred embodiment of the present invention.

DRAWINGS—REFERENCE NUMERALS 10 body
11 thumb pad
12 threaded holes
13 slot for locking screw
20 plunger
21 threaded hole for locking screw
30 locking screw
40 spring
50 retaining screw
60 retaining groove
70 chain link fence
71 parallel wires
80 cell phone with video camera
81 cell phone adaptor
82 attachment screw
83 small camera adaptor
84 small camera
99 fence clip preferred embodiment
111 base structural clip
121 top structural clip
131 screw
141 threaded attachment hole
151 adjustment slot
161 threaded holes
171 serrated face
199 fence clip structural embodiment
210 fixed groove block
220 adjustable groove block
221 pinch slot
230 spanner
240 pinch slot locking screw
299 external grip fence clip

DETAILED DESCRIPTION

Figure 2:
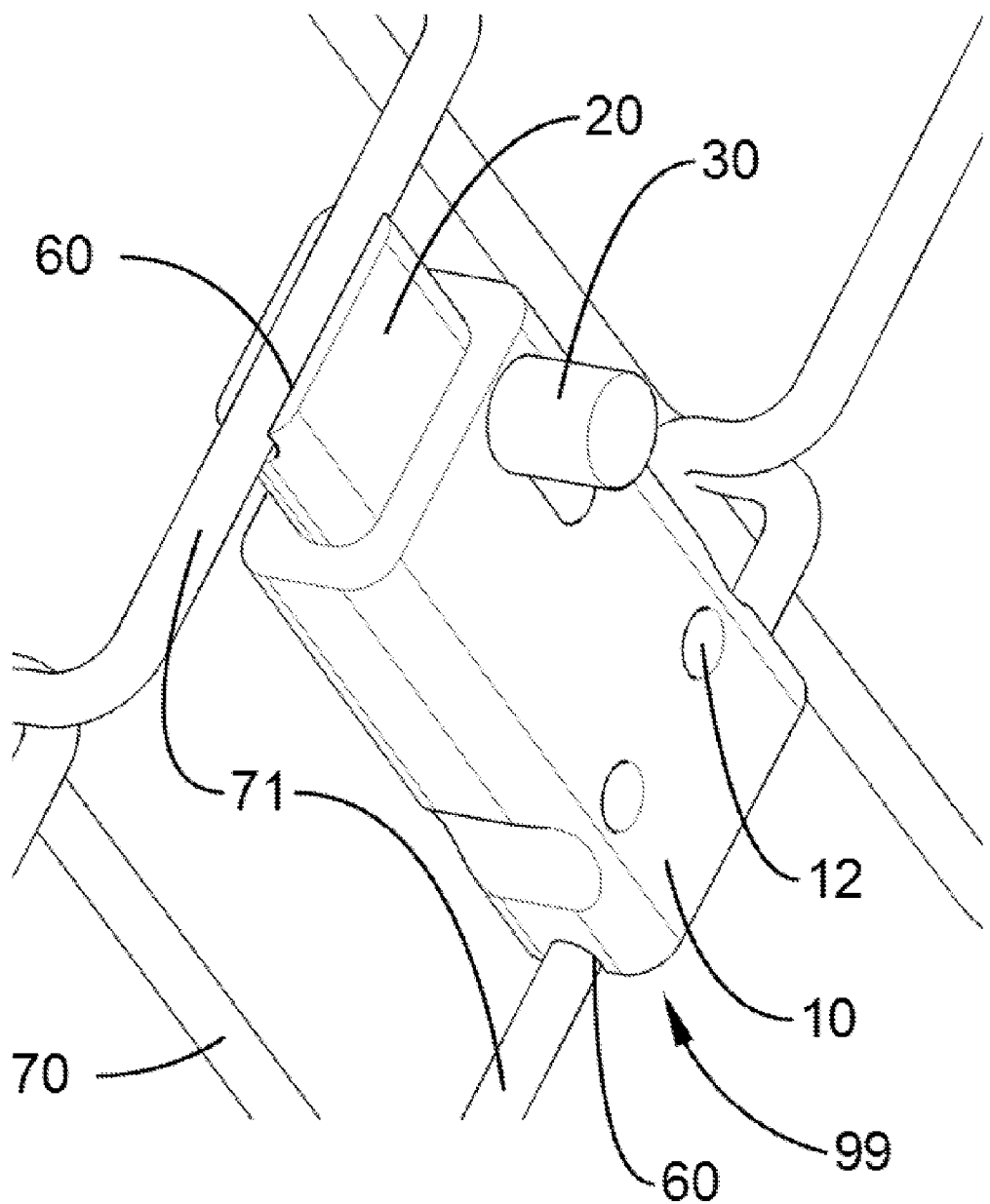
FIG. 2 is a perspective view of a preferred embodiment of the present invention attached to a chain link fence.

The preferred embodiment of the fence clip of the present invention is illustrated in FIG. 1 through FIG. 8 and is referred to by reference numeral 99. The body 10 of the fence clip has an inner cavity. The plunger 20 precisely fits in the inner cavity of the body in a slip-fit manner. There is enough space inside the body to compress the plunger down so the fence clip can fit within an opening in a chain link fence. The plunger 20 is spring loaded to return to its fully extended state. Once the fence clip is in the opening in the fence the retaining grooves 60 can be engaged with the fence and the plunger is allowed to return to its extended position retaining the opposing parallel wires. The thumb pads 11 allow for easy one handed installation and are representative of any industrial design effort to make the fence clip easier to grip. FIG. 2 shows the fence clip of the present invention installed in a chain link fence. The retaining grooves 60 mechanically engage with two parallel wires 71 and secure the fence clip in position. The locking screw 30 can be tightened to lock the two structural elements together and further secure the clip. The threaded holes 12 are provided in multitude and sized to provide a convenient attachment point for cell phones and small cameras.

This is a small, light device and there are many ways to install this fence clip in a fence. The easiest way to install the preferred embodiment of the present invention in a chain link fence is to hold the body 10 in one hand with a thumb and index finger retaining the thumb pads 11. Align the retaining groove of the plunger 20 with the fence wire of the desired diamond shaped opening in the fence and fit the retaining groove on the wire. Slight pressure will compress the plunger 20 into the body 10 of the fence clip 99. Keeping the plunger 20 compressed the body of the fence clip is swung into the opening in the fence. The retaining groove 60 on the body 10 is aligned with the opposing parallel wire 71 in the opening. The plunger is allowed to return to its extended position so both retaining grooves are firmly engaged with the fence wire. Tightening the locking screw 30 will secure the device.

The fence clip of the present invention is easily removed from a chain link fence in a similar manner. The locking screw 30 is loosened. The thumb pads 11 are gripped with the index finger and thumb of one hand. The body 10 is pushed toward the plunger 20 until the retaining groove of the body clears the adjacent fence wire. Then while holding the plunger in the compressed position the fence clip is pivoted out of the fence opening and allowed to return to its fully extended state. The fence clip can conveniently fit in a pocket.

FIG. 3A through FIG. 3C illustrate the principle drawing views of the preferred embodiment of the present invention. FIG. 3D provides a view of the profile of the retaining groove. The retaining grooves include sides that taper out toward the opening for the purpose of securely fitting the broadest range of fence wire diameters. The retaining groove is roughly as deep as the largest wire it could hold with the base of the groove sized to accommodate the smallest fence wires and the opening of the groove sized to fit the largest fence wires. The present invention includes a pair of opposed retaining grooves that are constrained to remain parallel for the purpose of engagement with the fence. The retaining grooves of the preferred embodiment expand to engage the fence.

Figure 4:
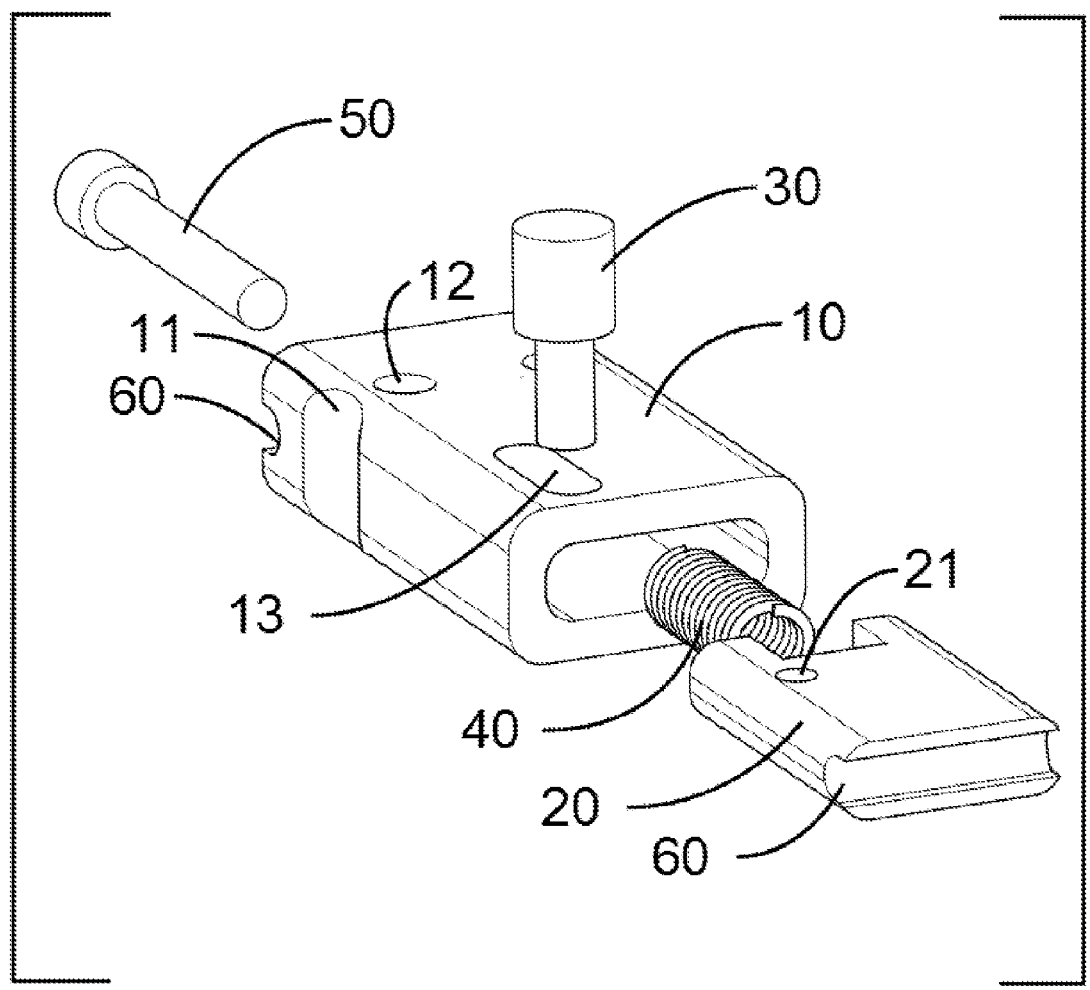
FIG. 4 is an exploded view of a preferred embodiment of the present invention displaying all components.

FIG. 4 is an exploded view of the preferred embodiment of the present invention. The spring 40 fits under the plunger 20 and forces the plunger and the body apart until they engage with the fence wire or until the maximum travel allowed by the retaining screw 50. The retaining screw can be tightened or loosened into a threaded hole in the bottom of the plunger to adjust the fence clip to different sized openings. The threaded hole 21 receives the locking screw 30. There is a properly sized slot 13 in the body 10 to allow the locking screw to ride freely with the plunger. Once the fence clip is in position the locking screw is tightened squeezing the body between the locking screw and the plunger to secure the device in position.

Figure 5:
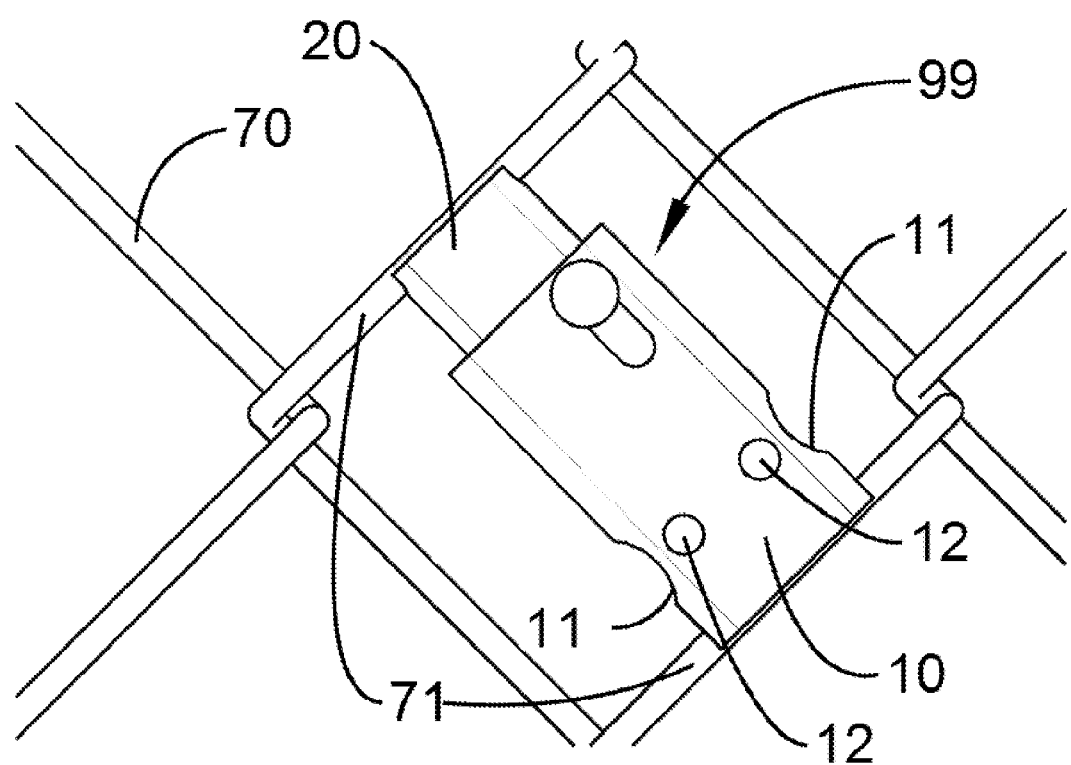
FIG. 5 is a front view of the present invention attached to a chain link fence.

FIG. 5 illustrates the preferred embodiment of the present invention in a front view attached to a chain link fence. The retaining grooves 60 are fully engaged with two parallel fence wires 71. The multitude of conveniently sized threaded holes 12 provide flexibility to attach any object to the present invention.

Figure 6:
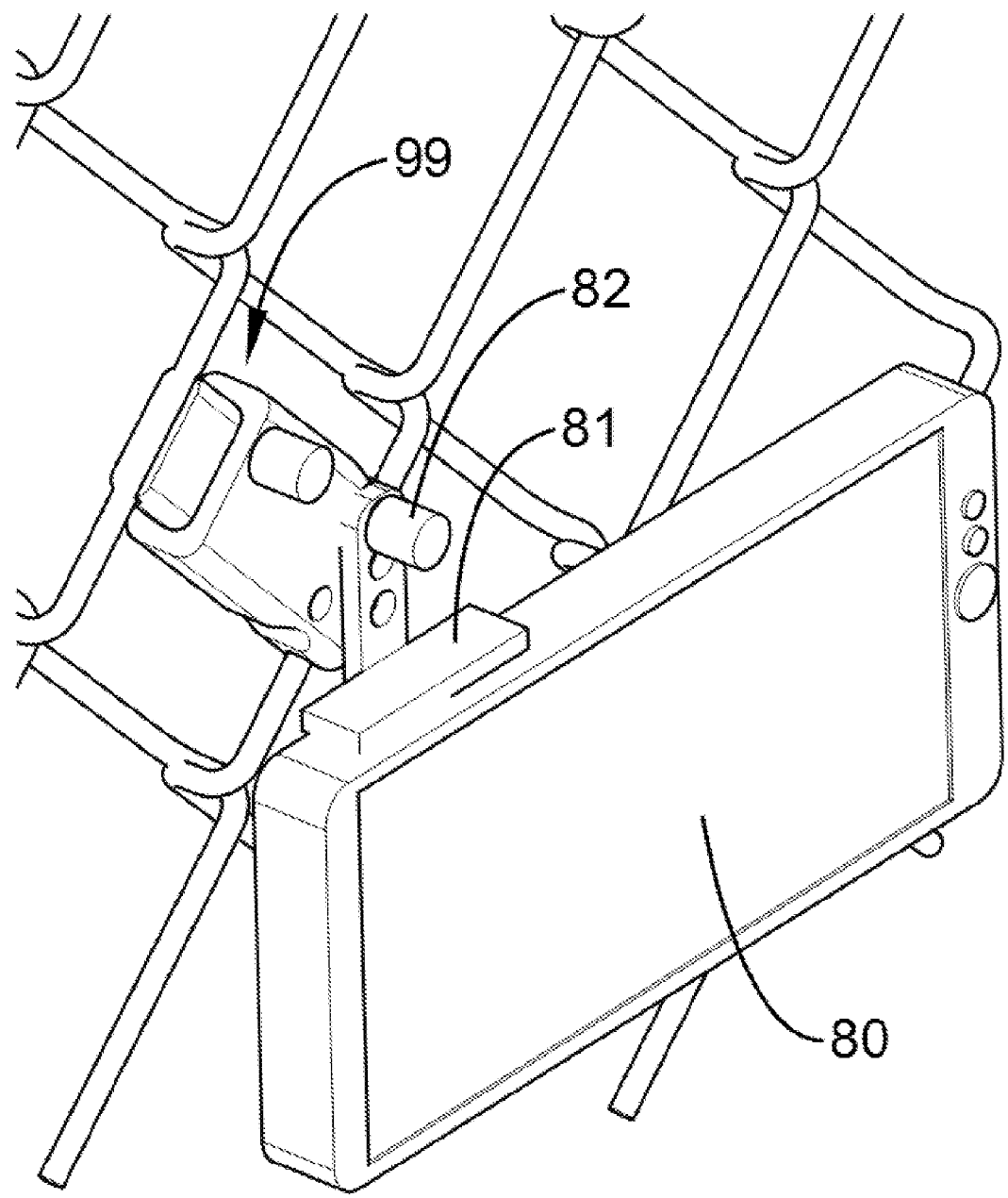
FIG. 6 is a perspective view of a preferred embodiment of the present invention shown attaching a cell phone to a chain link fence.

FIG. 6 illustrates the fence clip attached to a chain link fence providing an attachment point for a cell phone 80 with a video camera. The cell phone is connected to the fence clip with an adaptor 81 and an attachment screw 82 that tightens into one of the multitude of threaded holes 12. FIG. 6 illustrates the woven nature of chain link fence.

Figure 7:
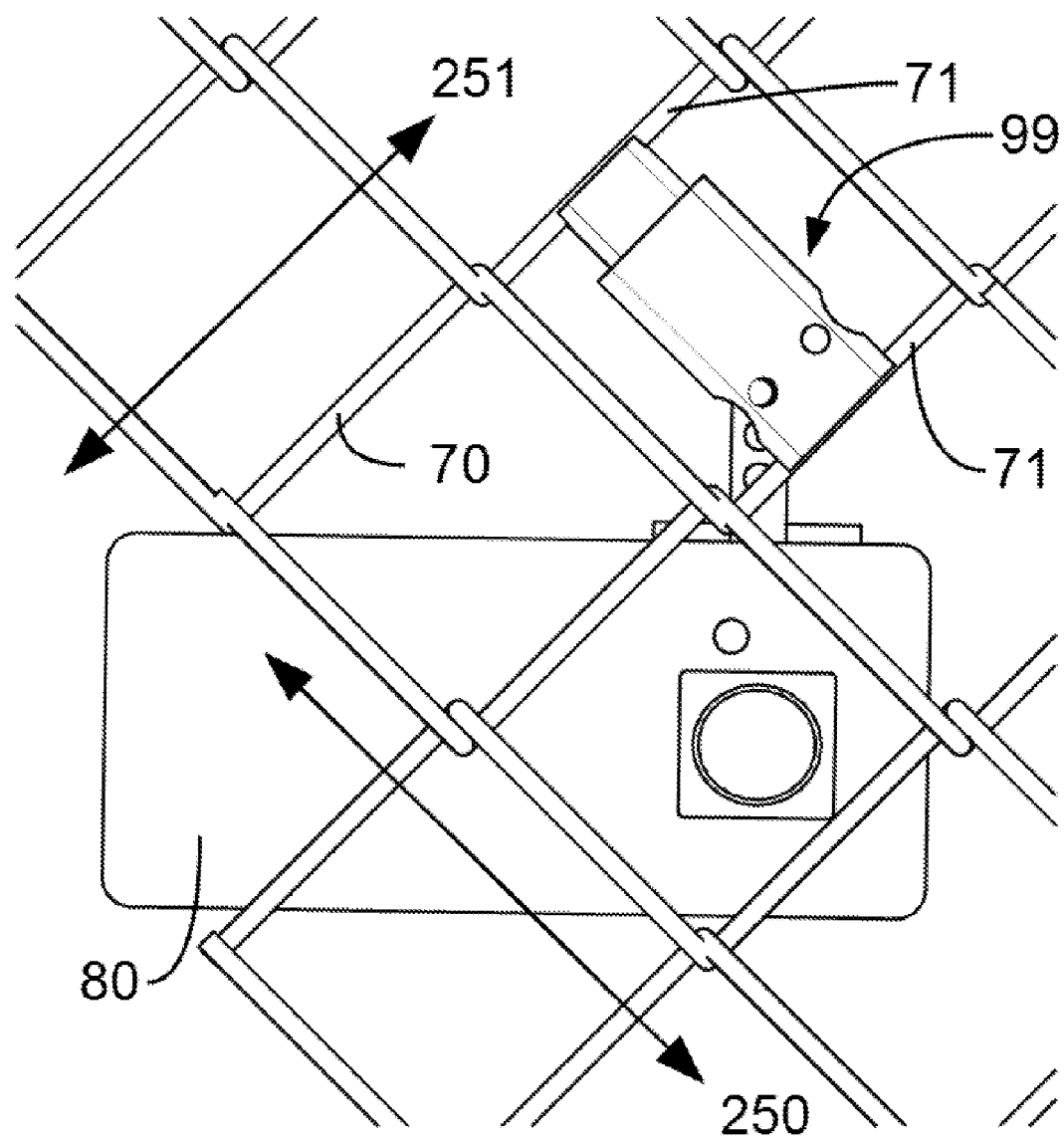
FIG. 7 is a back view or field view of a preferred embodiment of the present invention shown attaching a cell phone to a chain link fence.
Figure 8:
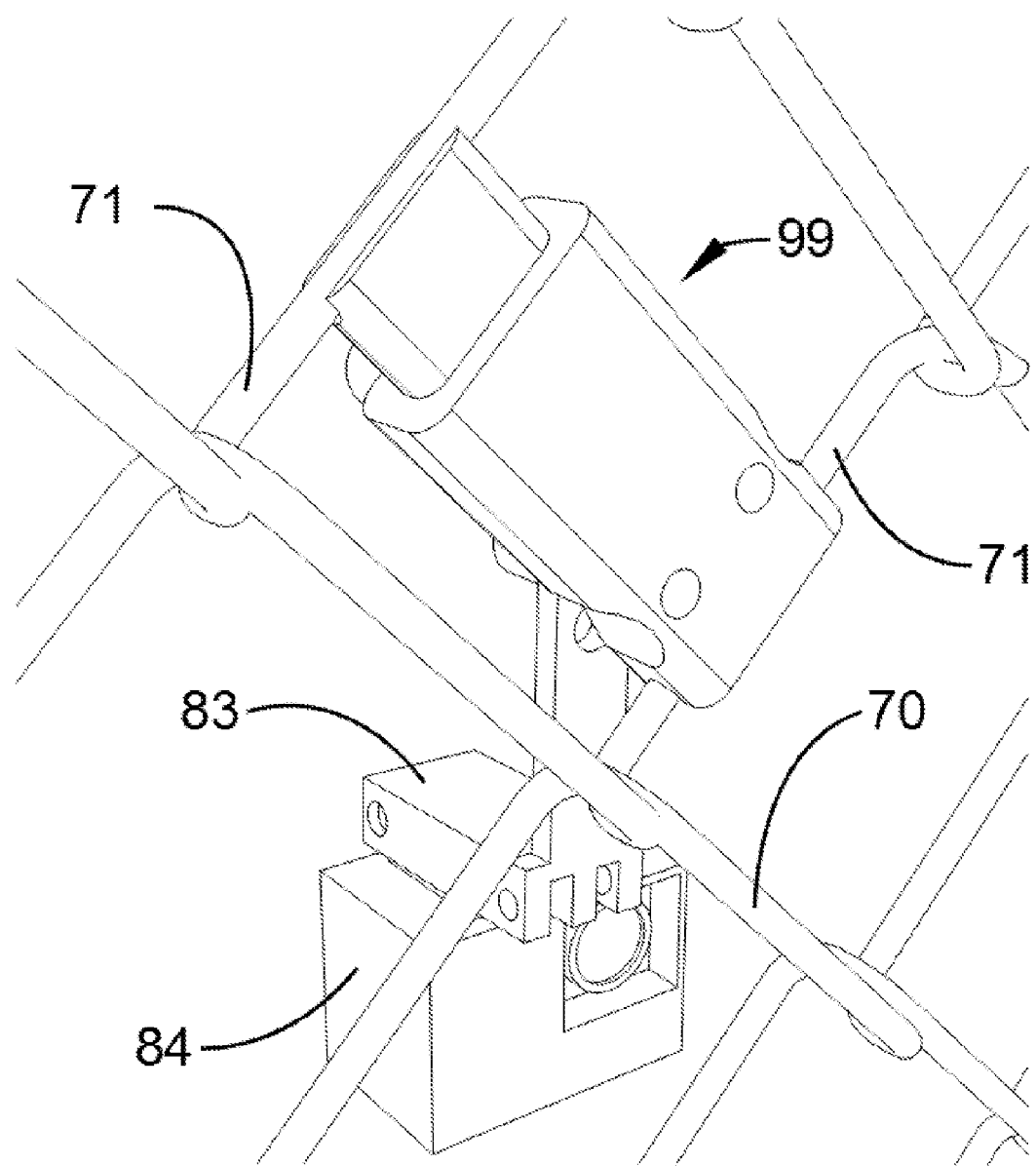
FIG. 8 is a perspective view from the field of a preferred embodiment of the present invention shown attaching a small camera to a chain link fence.

FIG. 7 is a back view of the preferred embodiment of the present invention shown attaching a cell phone to a chain link fence. FIG. 7 is viewed from the perspective of the field of play. The fence clip 99 in FIG. 7 is applying force in the direction 250 within the plane of the fence. Rotating the clip ninety degrees and installing it to apply force in direction 251 is also within the plane of the fence. In FIG. 8 the preferred embodiment of the present invention is shown clipping a small camera to a chain link fence. An adaptor 83 connects the small camera 84 to the fence clip 99. FIG. 8 illustrates the dual plane woven nature of chain link fence and the manner in which the fence clip by design attaches to two co-planar wires.

The body of the fence attachment clip 10 and the plunger 20 are machined from aluminum or other strong light material, or cast in thermoplastic resin. The fence clip 99 has thumb pads 11 machined into the body 20 of the device that are representative of functional features that make the device easier to grip or provide tactile advantage. Aluminum parts are shaped to provide cosmetic value and anodized to prevent oxidation. Plastic parts are shaped, textured, and colored to provide tactile and cosmetic value.

Figure 9:
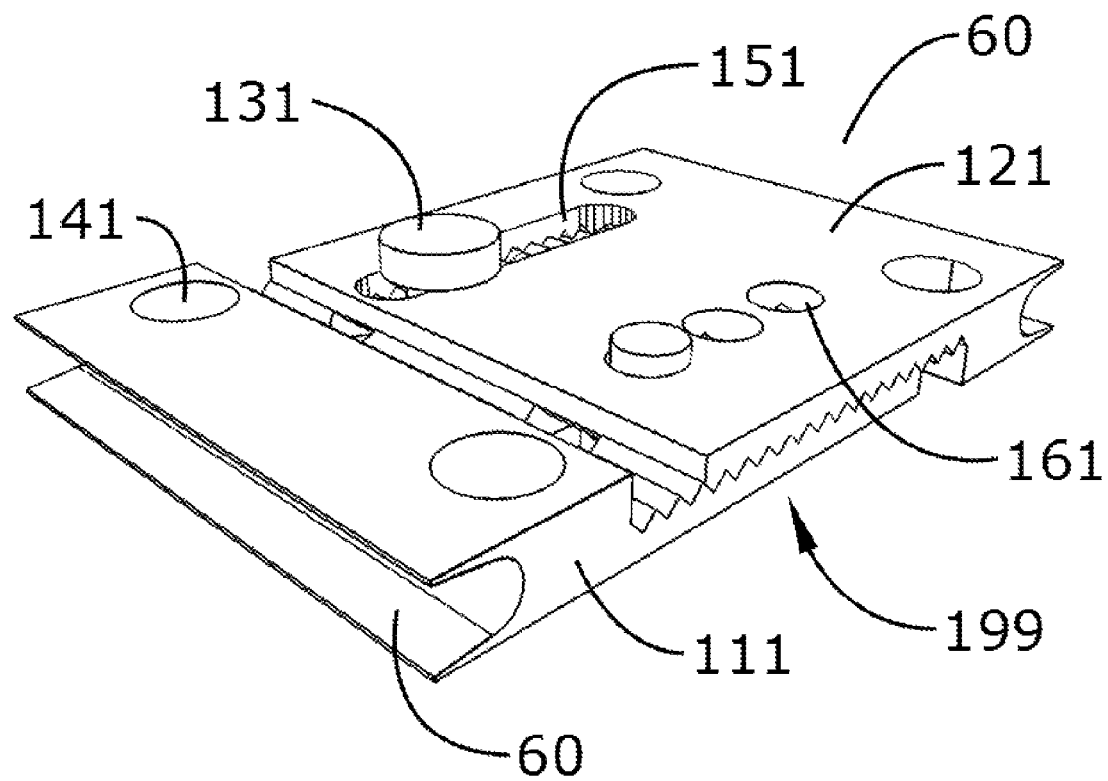
FIG. 9 is a perspective view of a structural embodiment of the present invention.
Figure 10:
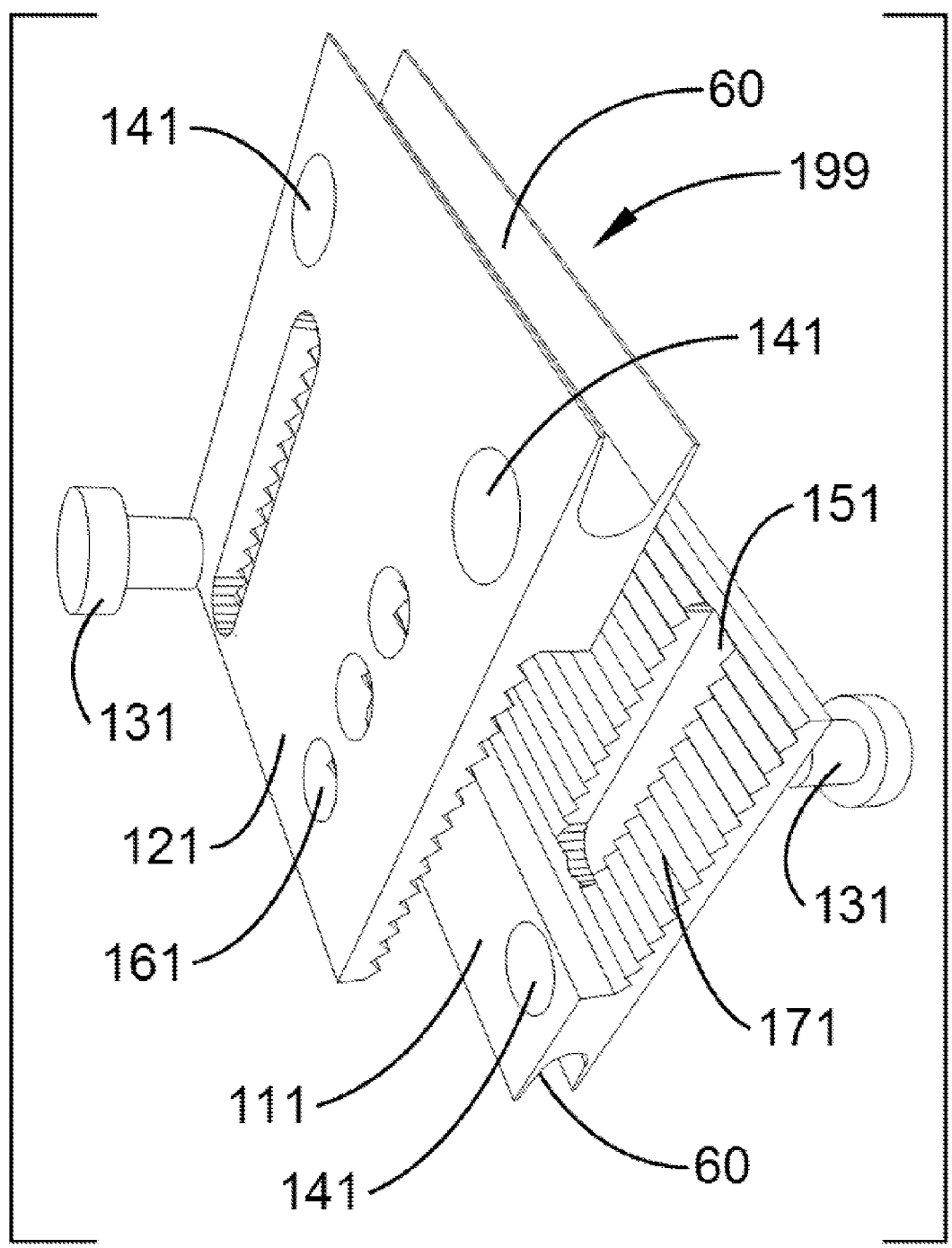
FIG. 10 is an exploded perspective view of a structural embodiment of the present invention.

The structural embodiment of the fence clip is an alternative embodiment of the present invention 199 and illustrated orthographically in FIG. 9 and in exploded view in FIG. 10. The structural embodiment of the fence clip is comprised of a base structural clip 111 and a top structural clip 121 attached together with at least two screws 131. The structural embodiment has retaining grooves 60 that engage with two parallel fence wires. The base and top structural clips have matching serrated faces 171 such that once they are engaged with the fence and screwed together the structural clip 199 is locked in position. A combination of slots 151 and threaded holes 161 in the structural clips allow for adjustment to fit a range of chain link fence opening sizes. A multitude of threaded holes 141 are provided to enable a secure structural attachment of an object to a chain link fence.

The structural fence clip embodiment 199 is most economically produced as an extrusion, cut to width, drilled, tapped, and de-burred. Steel parts can be formed to shape and bolted together in pairs. Thermoplastic parts can be formed in a mold. The structural fence clip provides larger threaded holes sized to provide more robust structural attachment. The structural embodiment shows two holes that represent a multitude of holes.

Figure 11:
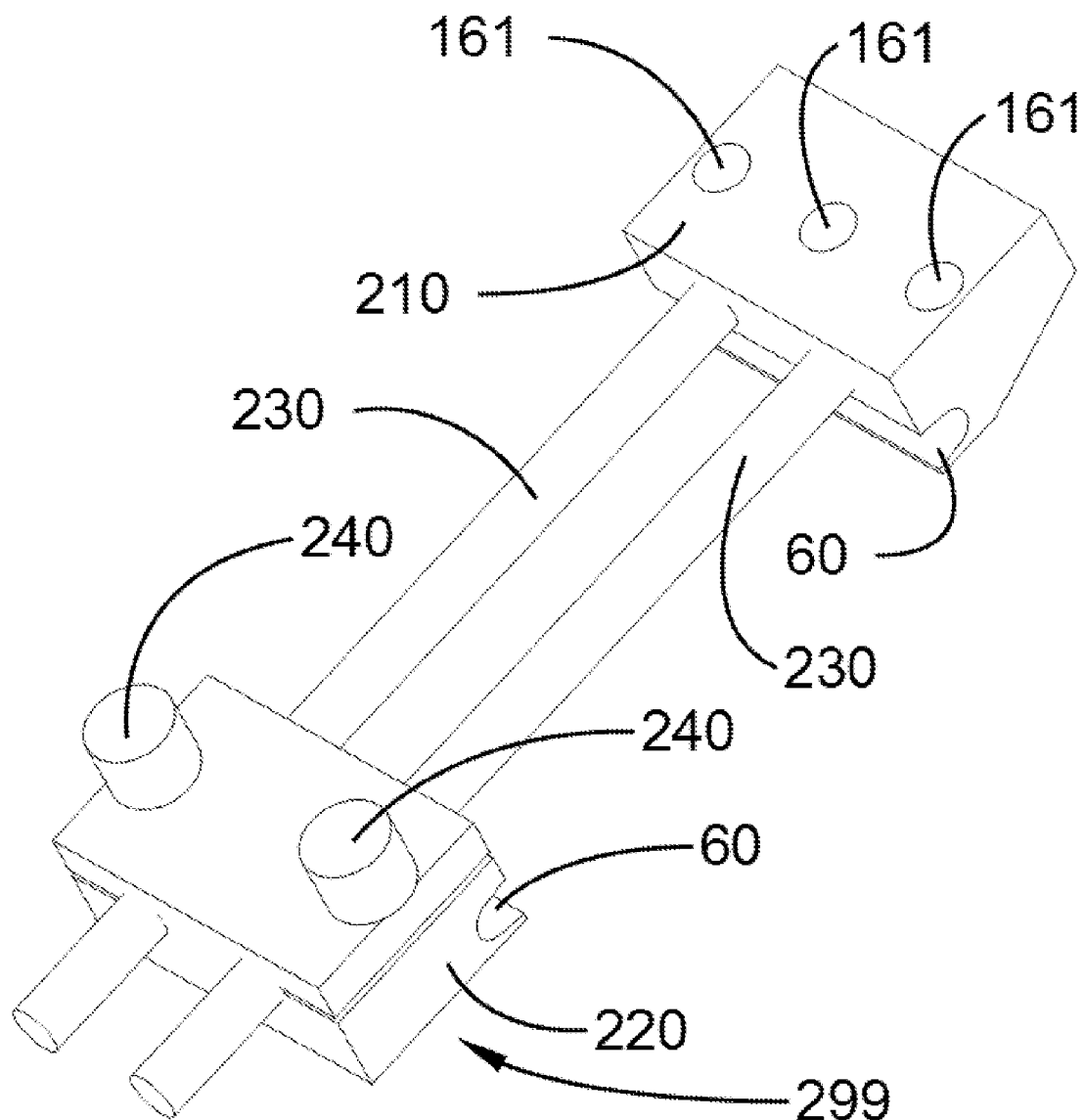
FIG. 11 is perspective view of an external grip fence clip embodiment of the present invention.
Figure 12:
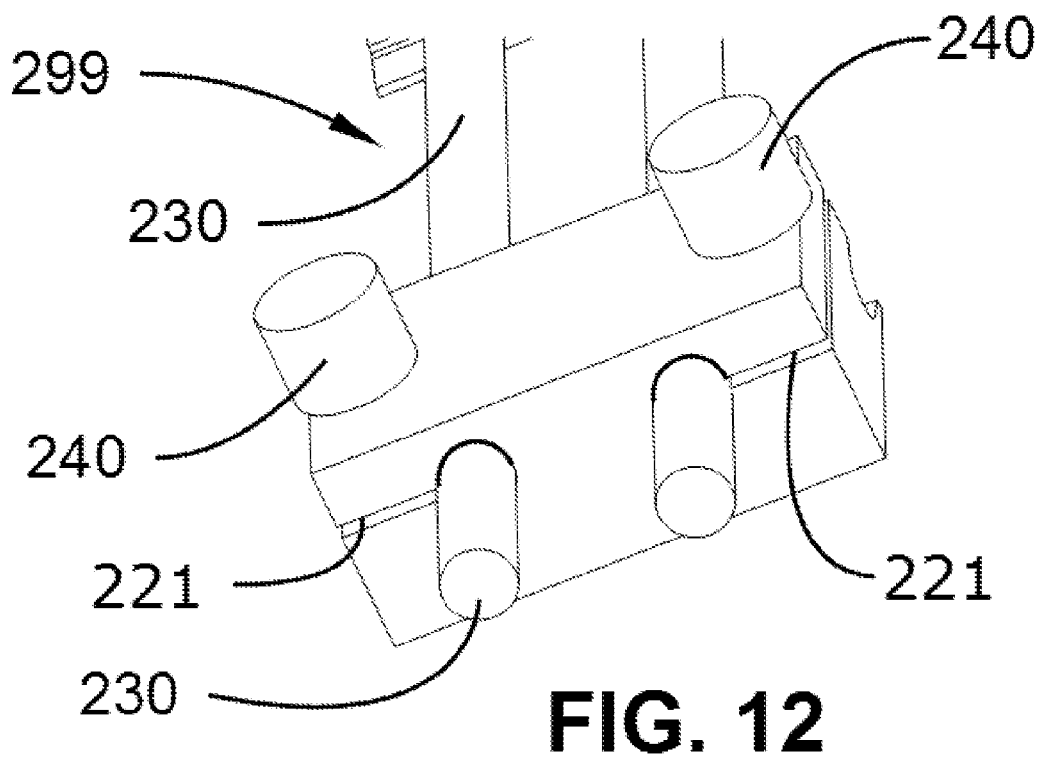
FIG. 12 is perspective view of the adjustable end of the external grip fence clip embodiment of the present invention.
Figure 13:
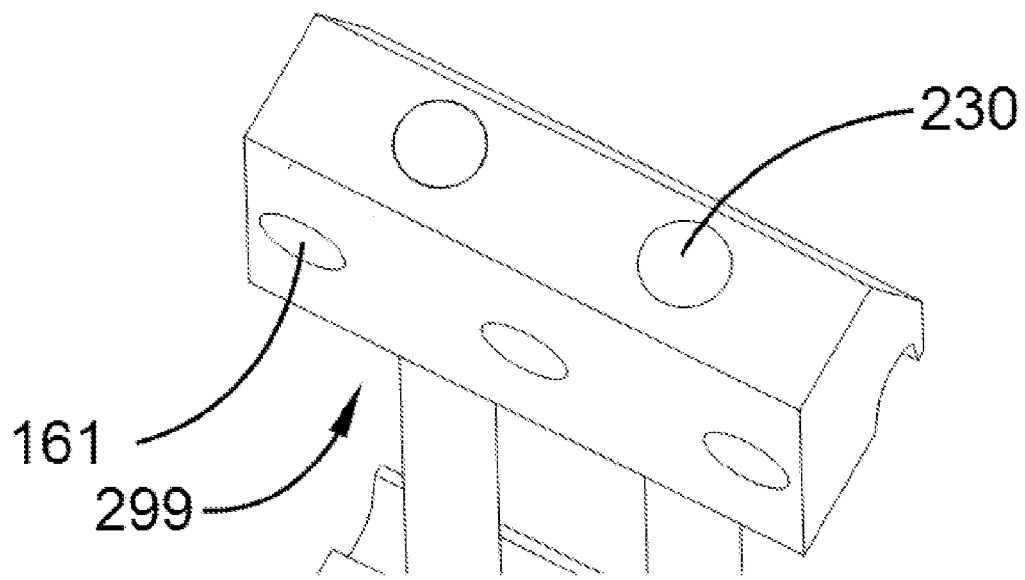
FIG. 13 is perspective view of the fixed end of the external grip fence clip embodiment of the present invention.
Figure 14:
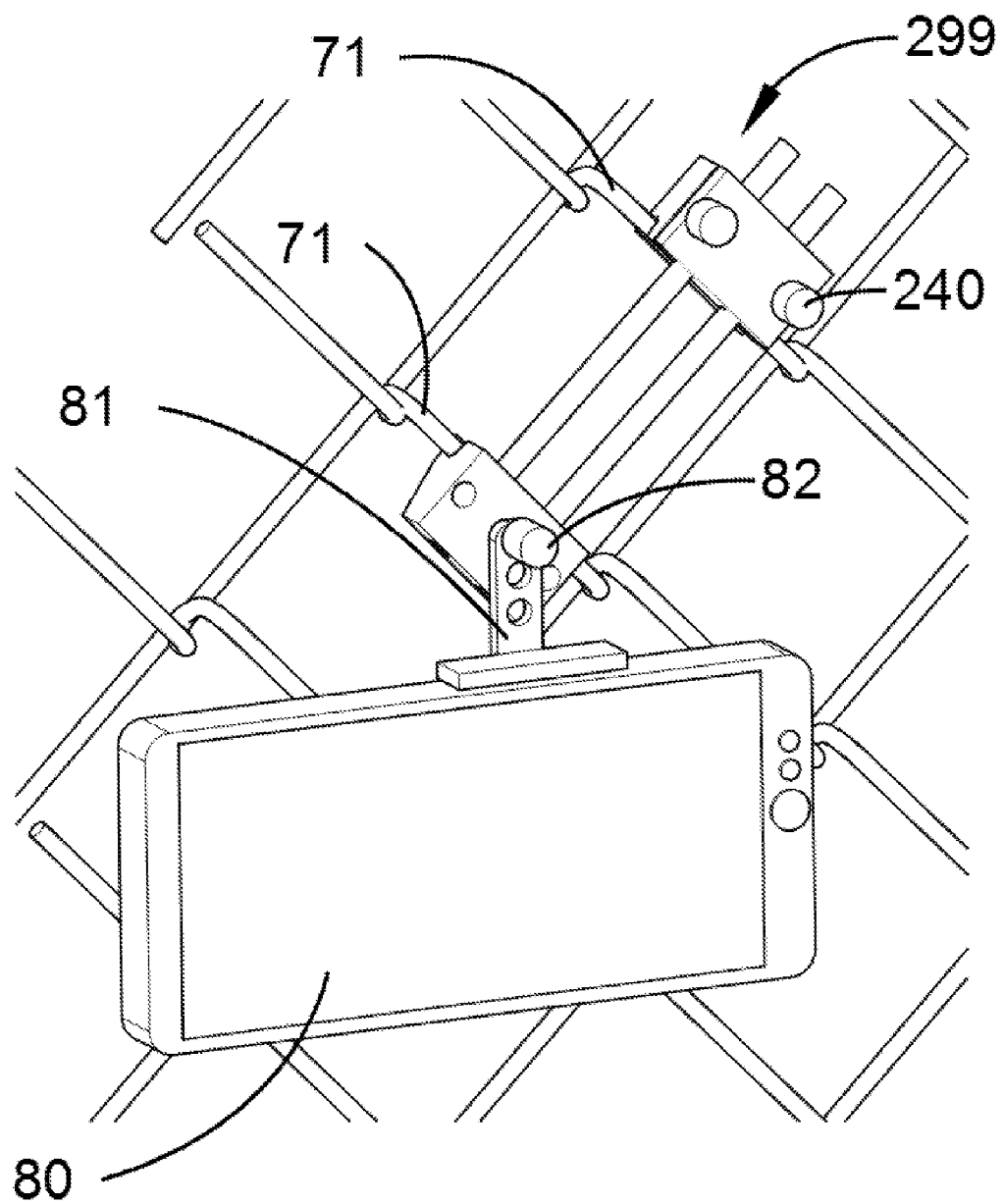
FIG. 14 is perspective view of the external grip fence clip attached to two parallel wires in a chain link fence attaching a cell phone to said fence.

FIG. 11 provides a perspective view of an external grip fence clip alternative embodiment of the present invention. The external grip fence clip 299 has a fixed groove block 210 and an adjustable groove block 220 attached by spanners 230. The fixed groove block is tightly secured to the spanners. Each groove block has a matching retaining groove 60. The adjustable groove block is a slip fit on the spanners and moves freely to adjust the device to engage the fence as displayed in FIG. 14. The adjustable groove block is positioned to engage the external grip fence clip with two parallel wires in the fence. Once in position the pinch slot locking screws 240 are tightened compressing the pinch slot and squeezing the spanner in the adjustable groove block locking the external grip fence clip 299 into engagement with the fence as shown in FIG. 14. The external grip fence clip provides for unlimited adjustability to fit any chain link fence opening. The external grip fence clip 299 can span multiple openings in a chain link fence by extending the spanner 230 length. The retaining grooves in the alternate embodiment illustrated in FIG. 11 through FIG. 14 compress to engage the fence. Whether compressed or expanded to engage the fence the present invention applies force in the direction of the plane of the fence, not perpendicular to the fence or through the fence.

The external grip fence clip embodiment of the present invention is made from aluminum and steel. The groove blocks 210 and 220 are machined from aluminum adding retaining grooves, holes, threads, and slots as required. The aluminum parts are deburred and anodized for cosmetic value and durability. The spanners 230 are stainless steel round bar cut to length and deburred. The pinch slot locking screws 240 are steel and aluminum with oversized knurled head for finger tightening.

I claim:

1. A chain link fence attachment clip (fence clip) for securing items to a chain link fence that is composed of at least two structural elements mechanically constrained to move in a linear manner whereby the fence clip precisely engages with two parallel wires in said fence, the device comprising:
    a body (10) (FIGS. 1-5) that has an inner cavity on one end (FIG. 4) and a retaining groove (60) on the opposite end designed to precisely and securely engage with a single wire of a chain link fence (FIG. 2);
    a plunger (20) (FIGS. 1-5) with a retaining groove on one end (60) that securely engages a single wire of a chain link fence and an opposing end that precisely slip fits into the inner cavity of the body (FIG. 4); wherein there is enough space inside the body member to push the plunger into the body so the whole assembly can fit within a single opening in a chain link fence (FIG. 5);
    a spring (40) (FIG. 4) that fits inside the inner cavity of the body below the plunger and provides force to push the plunger into a fully extended state thereby engaging with two parallel fence wires;
    a retaining screw (50)(FIG. 4) that slips through a hole in the body, runs through the spring, and threads into the plunger holding the assembled fence clip together; said retaining screw limits the overall length of the device;
    a locking screw (30) (FIG. 4) that when tightened provides a friction lock securing the plunger to the body and locks the fence clip in place for semi-permanent attachment;
    and a multitude of threaded holes (12) (141) (161) (FIGS. 1-5, FIGS. 9-11) in the body (10) (FIGS. 1-5) of the fence clip to flexibly attach a variety of items to a chain link fence.

2. The invention as claimed in claim 1 wherein the fence clip is utilized as a means of attaching camera equipment to a chain link fence (FIGS. 6-8).

3. The invention as claimed in claim 1 wherein the two parallel retaining grooves include a profile with sides that taper out toward the opening (FIG. 3D), providing a v-shaped opening that when engaged with the fence provides two distinct lines of contact per fence wire tightly securing said fence clip in place (FIG. 2, FIG. 8, FIG. 14).

4. The invention as claimed in claim 1 wherein the entire fence clip fits within a single opening of a chain link fence (FIG. 2).

5. The invention as claimed in claim 4 wherein the fence wire retaining grooves are located on the periphery of the fence clip securing said device directly on the plane of the fence, neither on one side nor the other.

* * * * *